July 26, 1960     S. P. CALDWELL     2,946,128
GAGE MECHANISM
Filed Jan. 6, 1959                              2 Sheets-Sheet 1
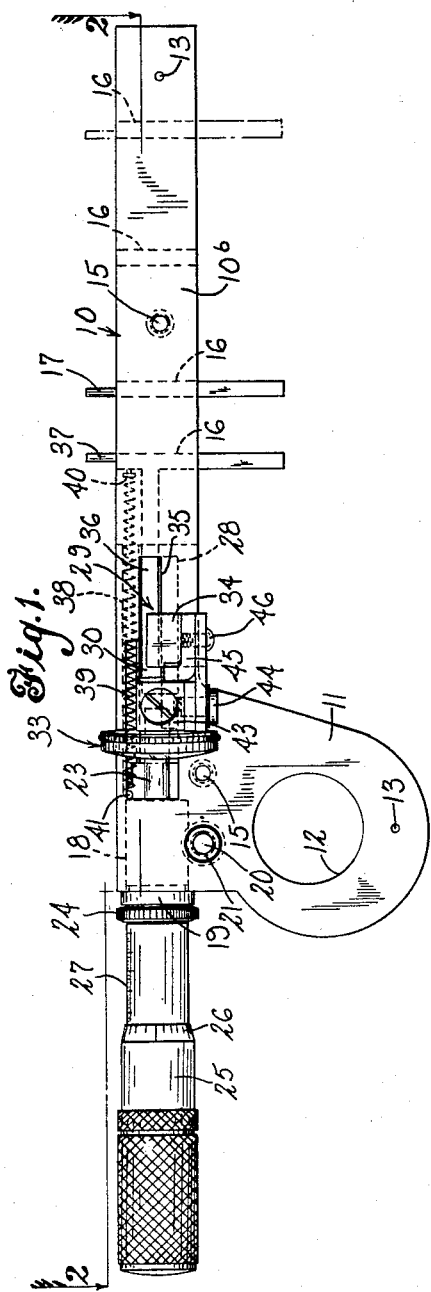
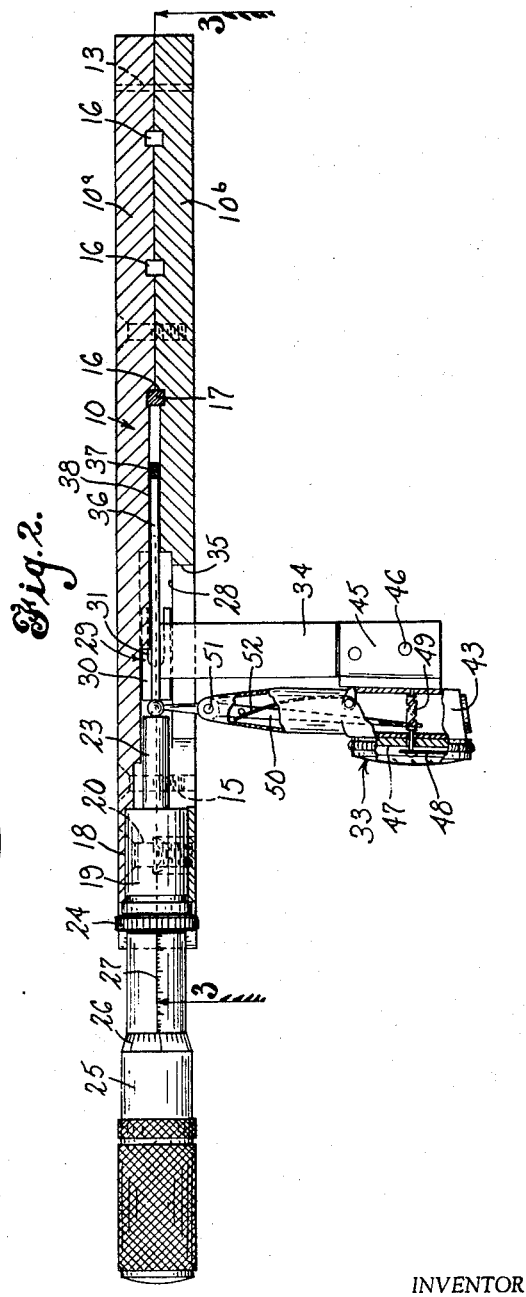
INVENTOR
Samuel P. Caldwell
BY *Rockwell & Bartholow*
ATTORNEYS July 26, 1960  S. P. CALDWELL  2,946,128
GAGE MECHANISM
Filed Jan. 6, 1959  2 Sheets-Sheet 2
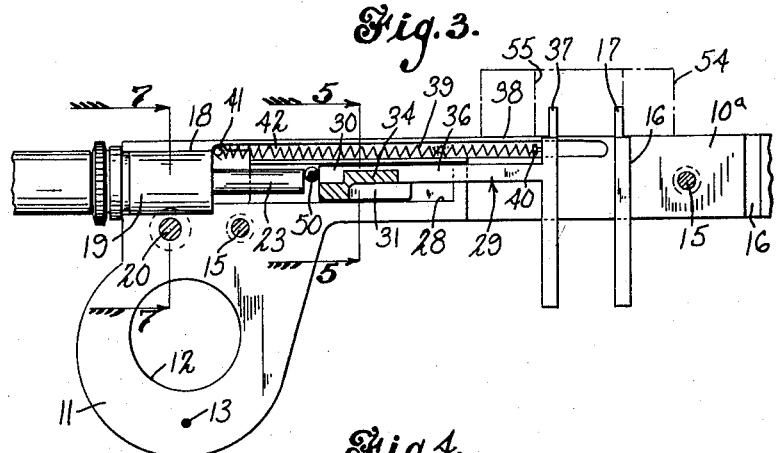
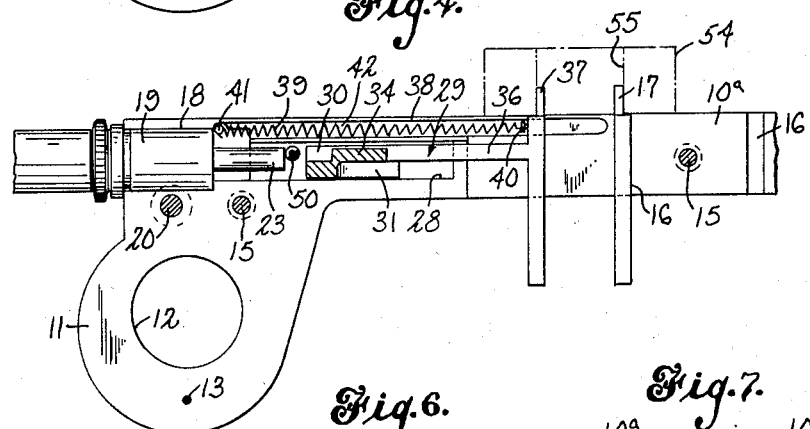
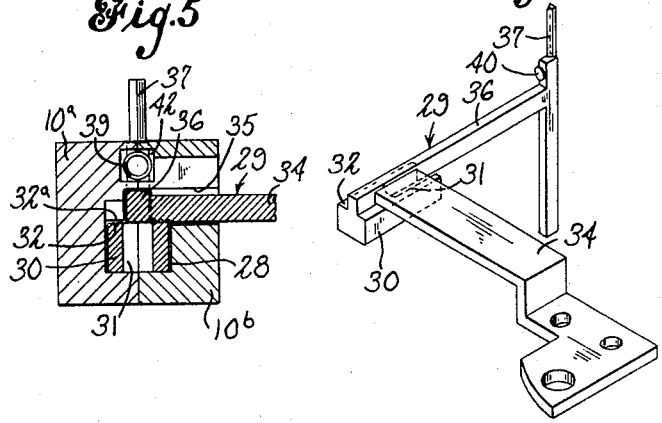
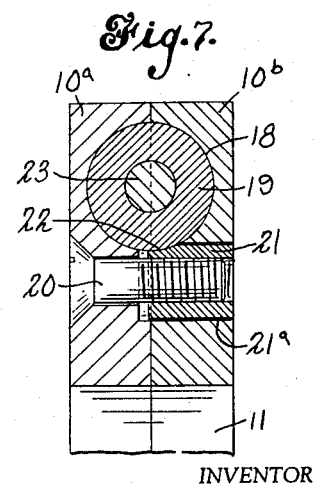
INVENTOR
Samuel P. Caldwell
BY Rockwell & Bartholow
ATTORNEYS

United States Patent Office 2,946,128
Patented July 26, 1960

2,946,128

GAGE MECHANISM

Samuel P. Caldwell, Hamden, Conn., assignor to The Greist Manufacturing Company, New Haven, Conn., a corporation of Connecticut Filed Jan. 6, 1959, Ser. No. 789,224

7 Claims. (Cl. 33—147)

This invention relates to gages, and relates more particularly to gages for measuring or comparing the internal diameters of holes and bores.

It has been found that in the use of gages of the type employing a micrometer screw, the accuracy of the measurement obtained by manipulation of the screw depends to a large extent upon the "touch" of the individual making the measurement. The "touch" of one individual may differ from the "touch" of another individual. In other words, two persons using the same gage to measure the same article may obtain different readings. This, obviously, is undesirable.

One object of the invention is to provide an improved gage employing a micrometer screw, for measuring or comparing the internal diameters of holes and bores.

Another object is to provide a gage such as characterized above, which is not dependent on the "touch" of the user to give an accurate measurement.

Still another object of the invention is to provide a gage which is of simple construction and yet is very accurate and reliable in use.

In the drawings:

Fig. 1 is a side elevational view of a gage embodying the invention;

Fig. 2 is a sectional view taken on line 2—2 of Fig. 1;

Fig. 3 is a sectional view taken on line 3—3 of Fig. 2;

Fig. 4 is a view similar to Fig. 3, but illustrating parts of the gage in different position;

Fig. 5 is an enlarged sectional view taken on line 5—5 of Fig. 3;

Fig. 6 is a perspective view of the slide employed in the gage; and

Fig. 7 is a sectional view taken on line 7—7 of Fig. 3.

In the drawings, the numeral 10 indicates generally a bar split in half lengthwise so as to have longitudinal parts or sections 10ª and 10ᵇ. The bar, at one end portion, is provided with a depending handle portion 11 formed by the sections 10ª and 10ᵇ. The portion 11 may be held in the fingers of the user and is apertured, as at 12, so that a finger of the user may extend through the portion 11 to steady the bar. The halves of the split bar, that is, the sections 10ª and 10ᵇ, are located relatively to one another by locater pins 13. The halves or sections of the bar 10 are rigidly held together in abutting relation by screws 15. As best shown in Fig. 2, the end portion of the bar 10 remote from the handle portion 11 is provided with a plurality of longitudinally spaced openings 16 arranged vertically. A stationary pin or feeler 17 is provided to be received in any one of the openings 16. As shown in Fig. 2, the openings 16 are formed between the halves of the bar 10. The feeler 17 which, in its assembled position, projects both above and below the bar 10, may be moved from its rearmost position, shown in full lines in Fig. 1, to the extreme forward position, shown in broken lines in the last-mentioned view. In assembled position the feeler 17 is clamped between the halves of the bar 10. To move the feeler forward it is first necessary to loosen the screws 15 to the extent that the feeler 17 may be slipped out of the bar and then slipped back in the bar through another of the openings 16. The screws 15 may then be tightened to hold the feeler in place. The purpose for which the feeler 17 may be adjusted along a portion of the bar will appear hereinafter.

The rear end portion of the bar 10 is provided with a longitudinal bore 18 above the handle portion 11 to receive the sleeve part 19 of a conventional screw micrometer. The bore 18 is provided between the halves of the bar, and a transversely extending screw 20 is provided to frictionally hold the sleeve part 19 in assembled relation with the bar, as best shown in Fig. 7. As shown in the last-mentioned view, the screw 20 is threaded into one end of a sleeve 21 received in a transverse bore 21ª of the bar. The sleeve 21 has a shoulder 22 which may be drawn into frictional engagement with the sleeve part 19 when the screw 20 is tightened. The screw micrometer may be withdrawn from the bar after first loosening the screw 20. The screw micrometer has the usual sleeve part 19, the usual binder ring 24 on the sleeve part 19, and the usual thimble 25 mounted on the sleeve part. The screw micrometer operates the usual spindle 23 which is movable in the sleeve part 19. The thimble 25 is provided with conventional indicia 26 arranged circumferentially thereof and cooperating with indicia 27 provided on the sleeve part.

Adjoining and forwardly of the bore 18 receiving the sleeve part 19 the bar 10 is provided with a longitudinal slideway 28 for a slide, the slideway 28 being formed between the halves of the bar 10 by opposing recesses. The slide, indicated generally at 29, has a guide part 30 received in the slideway 28 and of inverted T shape in cross section. The guide part 30 may be hollowed out, as at 31, and is provided with an upwardly facing shoulder 32 for cooperation with a downwardly facing shoulder 32ª formed on one-half of the bar, as best shown in Fig. 5. The rear extremity of the shoulder 32ª terminates a sufficient distance forwardly of the extreme forward position of the spindle 23 to provide clearance for the spindle and a gage, indicated generally at 33, associated with the spindle. The slide 29 has a mounting flange 34 for the gage 33, which extends laterally through an opening 35 in the bar 10, the opening 35 providing clearance for the flange 34 of the longitudinally movable slide. The flange 34, which may be formed integrally with the guide part 30 of the slide, extends laterally from the upper portion of the part 30, as indicated in Fig. 5. A bar portion 36 extends forwardly from the guide part 30 and may be formed integrally with the latter, the portion 36 having at its forward extremity an integral vertically arranged pin or feeler 37. A vertical slot 38 is formed between the halves of the bar to receive the feeler 37 which projects both above and below the bar, as shown in Fig. 1. The slot 38, which is arranged lengthwise of the bar to permit lengthwise adjustment of the feeler 37, extends to the rearmost opening 16 in the bar 10 so that the feeler 37, slidable with the guide part 30, may be moved to meet the feeler 17 when the latter is positioned in the rearmost opening 16. The slot 38 in the bar may be of a length sufficient to permit the feeler 37 to move rearwardly in the bar a distance sufficient to measure a length of one inch when the feeler 17 is received in the rearmost opening 16. The slide 29 is urged rearwardly by a tension spring 39 of helical form, having one end secured to the slide, as at 40, and the other end secured to the bar, as at 41, closely adjacent and forwardly of the sleeve part 19. As shown in Fig. 5, the spring 39 is received in a longitudinal groove 42 provided in the bar, and the arrangement is such that the spring constantly urges the slide 29 toward the spindle 23 with which it is aligned.

The gage 33, which is carried by the bar, may be of conventional construction and includes a casing 43 elongated lengthwise of the mounting flange 34 and to which it is attached, as by a screw 44. A flange plate 45 is provided to abut and angularly position the casing on the mounting flange 34 of the slide. The plate 45 may be secured to the flange 34 by screws 46. As shown in Fig. 2, a dial 47 is provided on the casing. The dial may be secured to the casing by conventional means and bears circumferentially arranged indicia, not shown, indicating minute plus and minus linear units of length at opposite sides of zero. A pointer 48 cooperates with the dial and is carried by a shaft suitably journaled in the casing and provided with a part 49 having a helical endless cam track thereon. The cam part 49 rotates with the shaft and cooperates with one end of a lever 50 which is pivoted to the casing at 51, intermediate the ends of the lever. As shown in Fig. 2, the other or inner end of the lever extends intermediate the spindle 23 and the guide part 30 of the slide for cooperation with these elements. From the foregoing, it will be manifest the swinging movement of the lever in one direction effects rotary movement of the cam part 49 and the pointer 48 in one direction while swinging movement of the lever in the opposite direction effects reverse rotation of the cam part and the pointer. A leaf spring 52 mounted in the casing abuts the lever urging the inner end of the lever toward the spindle 23 and away from the slide 29.

It is believed that the operation of the gage of the invention will be readily apparent from the foregoing description of its construction. To measure the diameter of a hole or bore it is necessary to first position the feeler 17 in the proper aperture 16 in the bar. The feeler 17 may be positioned in any one of the apertures 16, in accordance with the size of the diameter to be measured. To measure a distance up to one inch, the feeler 17 is placed in the rearmost aperture 16. In the form shown, the feeler 17 may be placed, for example, in the foremost aperture 16 to measure a distance of between two and three inches. The last-mentioned position of the feeler 17 is shown in broken lines in Fig. 1. When the feeler 17 is properly positioned in the bar the thimble 25 may be rotated in a direction to advance the spindle 23 and thereby move the slide 29 forwardly, so that both feelers may be inserted in the hole or bore to be measured. This movement of the spindle 23 effects movement of the slide 29 through the inner end of the lever 50, which may be engaged by the spindle and, in turn, engages the slide.

For the purpose of illustrating the use of the gage, a part to be measured is shown in Figs. 3 and 4 and indicated generally at 54, the part having a hole 55 therein. The feelers 17 and 37 may be moved relatively to each other by operation of the thimble 25, as aforesaid, so that they may be received in the hole 55 without binding or pressing thereagainst, as shown in Fig. 3. The thimble 25 may then be rotated in the opposite direction to effect relative separating movement of the feelers 17 and 37. This separating movement is brought about by rearward movement of the spindle 23, which permits following movement of the spring-pressed slide 29 carrying the feeler 37. It will be understood that the gage 33 moves rearwardly with the slide which carries it, and that as long as the spindle 23 acts to hold the inner end of the lever 50 against slide 29 during rearward movement of the spindle, there is no movement of the lever relatively to the slide. It will be further understood that when the feeler 37 of the slide impinges the side of the hole 55, and the feelers 17 and 37 are diametrically disposed with respect to the hole and both engage the wall thereof, further rearward movement of the slide is prevented, as shown in Fig. 4. When this occurs and rearward movement of the spindle is continued, the spindle moves away from the slide, thereby permitting the inner end of the spring-pressed lever 50 to move rearwardly away from the slide, following the spindle. This movement of the lever 50 effects movement of the rotary cam part 49 and a corresponding movement of the pointer 48 on the dial 47. As the inner end of the spring-pressed lever 50 moves rearwardly away from the slide, a minus reading is effected on the dial.

It will be manifest that the degree of movement of the pointer 48 is dependent on the degree of swinging movement of the lever 50, and that the slightest movement of the pointer on the dial indicates to the user that the thimble has been rotated too far, that is, the spindle has been withdrawn too far to give a proper reading of the screw micrometer. The user may then advance the spindle by rotation of the thimble in the opposite direction. The spindle is advanced just far enough to effect the return of the lever 50 and the pointer 48 to their normal positions. At this point, a correct measurement may be read by noting the position of the indicia carrying thimble on the indicia-carrying sleeve part.

It will be understood that in this manner a very accurate measurement may be obtained and a measurement which does not depend for its accuracy on the "touch" of the user. Furthermore, it will be apparent that two persons using the same gage to measure the same article will tend to obtain the same reading. This is a distinct advantage of the gage. Another advantage of the gage is that a longer feeler may be substituted for the feeler 17, when necessary, and a slide with a longer feeler may be substituted for the slide 29.

It will also be apparent that the gage may be used as a comparator. For example, a part having a hole therein previously determined to be of a certain size may be placed on the gage. The thimble may then be manipulated to produce movement of the pointer to an arbitrary point on the dial. The part may then be removed and a similar part to be compared with the first part may be substituted on the feelers of the gage, without moving the thimble. To facilitate the substitution the feelers may be grasped below the bar by the thumb and forefinger and moved relatively toward one another. If the pointer does not assume the same position on the dial that it did when the first part was on the gage, but moves to a different position, an indication is given by the position of the pointer that the hole is larger or smaller. The exact difference may also be noted by comparing the two dial readings. The gage may also be used as a comparator employing a ring master. For example, if it is desired to check a hole which should measure .250 of an inch but which may have a plus or minus tolerance of .005 of an inch, a ring master having an internal diameter of .240 of an inch is employed. The ring is placed over the feelers and the screw micrometer is adjusted to .250. This results in a reading of minus .01 of an inch on the dial, and the screw micrometer and the dial, when read together, give an accurate reading of .240, the diameter of the ring. While the ring is still on the feelers, the dial is subsequently turned so that the pointer registers with zero on the dial. The screw micrometer is then adjusted to .260 while the ring remains on the feelers. This effects a reading on the dial of minus .01 of an inch which, of course, does not effect the actual size of the ring by reason of the previous setting of the dial to zero. However, when the part to be measured is subsequently substituted for the ring master, the pointer will indicate whether the part is within the tolerance and the exact size of the hole or internal diameter. For example, if the part has an internal diameter of .257, the pointer will swing on the dial past zero to plus .007 to indicate that the part is .002 above the tolerance. If the part has an internal diameter measuring .244 or .001 below the tolerance, the pointer will swing on the other side of zero to minus .006. It will be understood from the foregoing that the part to be within the tolerance must effect a reading on the dial between plus and minus .005.

While only one form of the gage has been illustrated in the accompanying drawings and described above, it will be apparent to those versed in the art that the gage is susceptible of various modifications and changes in details without departing from the prinicples of the invention and the scope of the claims.

What I claim is:

1. In a gage of the micrometer type for measuring an internal diameter, a support member, a stationary feeler on said member, a screw micrometer on the support member, a spindle on said member operable upon manipulation of said screw micrometer for adjustment toward and away from the feeler, a second feeler, and means intermediate the spindle and the first feeler and including a slide part carrying the second feeler for movement therewith, the slide part being slidably supported on the member for movement toward the first feeler or the spindle and being spring biased toward the latter, said means also including an indicating device to indicate when, as the spring-biased slide part moves away from the first feeler following the spindle during the taking of a measurement, movement of the second feeler becomes obstructed by the article which is being measured, said indicating device including a movable actuating part extending between and engageable with the slide part and the spindle.

2. A gage as defined in claim 1 wherein said movable actuating part of the indicating device is spring biased and normally engaged with the spindle and the slide part, but disengages the slide part when movement of the second feeler becomes obstructed.

3. A gage as defined in claim 2 wherein the indicating device includes a pointer and also includes a dial cooperating with the former to indicate the degree of separation of said actuating part from the slide part, and wherein said actuating part is operably connected to the pointer.

4. A gage as defined in claim 3 wherein the indicating device is carried by the slide part.

5. A gage as defined in claim 4 wherein said movable actuating part of the indicating device comprises a lever, pivotally supported from the slide part, having a portion thereof normally engaged with the slide part and the spindle and spring biased toward the latter.

6. In a gage of the micrometer type for measuring an internal diameter, a bar, a stationary feeler adjustable to any one of a plurality of positions along the bar, a screw micrometer mounted on one end of the bar, a spindle on the bar operable upon manipulation of the screw micrometer for adjustment toward and away from the feeler, a second feeler, a slide intermediate the first feeler and the spindle and carrying the second feeler for movement therewith, the slide being slidably supported on the bar for movement toward the first feeler of the spindle and being spring biased toward the latter, the slide having a part thereof projecting from the bar, and an indicating device supported from said part of the slide for movement therewith and indicating when, as the spring-biased slide moves away from the first feeler following the spindle during the taking of a measurement, movement of the second feeler becomes obstructed by impingement of the last-mentioned feeler with the article which is being measured, said indicating device comprising a movably mounted actuating part which is normally engaged with both the spindle and the slide but which disengages the slide when movement of the second feeler becomes obstructed.

7. In a gage of the micrometer type for measuring an internal diameter, a bar, a stationary feeler on the bar, a screw micrometer mounted on one end of the bar, a spindle on the bar operable upon manipulation of the screw micrometer for adjustment toward and away from the feeler, a second feeler, a slide intermediate the first feeler and the spindle and carrying the second feeler for movement therewith, the slide being slidably supported on the bar for movement toward the first feeler or the spindle and being spring biased toward the latter, the slide having a part thereof projecting from the bar, and an indicating device supported from said part of the slide for movement therewith and indicating when, as the spring-biased slide moves away from the first feeler following the spindle during the taking of a measurement, movement of the second feeler becomes obstructed by impingement of the last-mentioned feeler with the article which is being measured, said indicating device comprising a spring-biased movably mounted actuating part which is normally engaged with both the spindle and the slide part but which disengages the slide when said movement of the second feeler becomes obstructed, the indicating device also comprising a pointer and a dial, the former cooperating with the latter to indicate the degree of separation of the actuating part from the slide, and the actuating part being operably connected to the pointer.

References Cited in the file of this patent

UNITED STATES PATENTS

| | | |
|---|---|---|
| 2,741,848 | Livingston | Apr. 17, 1956 |
| 2,873,533 | Wilson | Feb. 17, 1959 |